United States Patent
Niclass et al.

(10) Patent No.: US 8,168,934 B2
(45) Date of Patent: May 1, 2012

(54) INTEGRATED CIRCUIT COMPRISING AN ARRAY OF SINGLE PHOTON AVALANCHE DIODES

(75) Inventors: Cristiano Niclass, Clarens (CH); Edoardo Charbon, Echandens (CH)

(73) Assignee: Ecole Polytechnique Federale de Lausanne (CH)

( * ) Notice: Subject to any disclaimer, the term of this patent is extended or adjusted under 35 U.S.C. 154(b) by 25 days.

(21) Appl. No.: 12/468,084

(22) Filed: May 19, 2009

(65) Prior Publication Data

US 2010/0127160 A1 May 27, 2010

Related U.S. Application Data

(63) Continuation of application No. 11/353,244, filed on Feb. 14, 2006, now Pat. No. 7,547,872.

(60) Provisional application No. 60/652,010, filed on Feb. 14, 2005.

(30) Foreign Application Priority Data

Feb. 14, 2005 (EP) .................................. 05101069

(51) Int. Cl.
*G01J 1/44* (2006.01)
*H03F 3/08* (2006.01)
(52) U.S. Cl. ..................... 250/214 R; 330/308
(58) Field of Classification Search ................. 250/551, 250/214 A, 214 RC, 214 LA, 214 R, 221, 250/206.1, 208.2, 214.1; 330/308; 327/11, 327/125, 128, 330
See application file for complete search history.

(56) References Cited

U.S. PATENT DOCUMENTS

| | | | |
|---|---|---|---|
| 3,925,704 A * | 12/1975 | Camic .................... 315/200 A |
| 4,303,861 A | 12/1981 | Ekstrom |
| 4,710,817 A | 12/1987 | Ando et al. |
| 5,021,854 A * | 6/1991 | Huth .......................... 257/438 |
| 5,517,035 A * | 5/1996 | Krijntjes ..................... 250/551 |
| 5,619,040 A | 4/1997 | Shapiro et al. |
| 5,721,506 A * | 2/1998 | Imam et al. ................. 327/330 |
| 5,784,352 A | 7/1998 | Swanson et al. |
| 5,789,263 A | 8/1998 | Kuo et al. |
| 5,892,575 A | 4/1999 | Marino et al. |

(Continued)

FOREIGN PATENT DOCUMENTS

EP 1191598 A1 3/2002

OTHER PUBLICATIONS

E/P. Walker, Y. Zhang, A. Dvornikov, P. Rentzepis, and S. Esener, Two-photon volumetric optical disk storage systems experimental results and potentials, Call/Recall, Inc., 2003, 3 pgs.

(Continued)

*Primary Examiner* — Georgia Y Epps
*Assistant Examiner* — Don Williams
(74) *Attorney, Agent, or Firm* — Blank Rome LLP (57) ABSTRACT

Integrated circuit (1) comprising:
  an array of single photon avalanche diodes (SPADs),
  a plurality of read-out circuits, each SPADs being coupled to one read-out circuit, wherein at least some of the read-out circuits comprise time-to-digital converters (TDC) and/or a digital asynchronous counter,
  wherein a plurality of SPADs are coupled to one single read-out circuit.
The read-out circuit may comprise a transformer for decoupling the SPAD from other parts of said read-out circuit.

11 Claims, 4 Drawing Sheets

U.S. PATENT DOCUMENTS

| | | | |
|---|---|---|---|
| 6,218,657 | B1 | 4/2001 | Bethune et al. |
| 6,300,612 | B1 | 10/2001 | Yu |
| 6,376,321 | B1 | 4/2002 | Popovic et al. |
| 6,384,663 | B2 * | 5/2002 | Cova et al. ............... 327/514 |
| 6,392,282 | B1 | 5/2002 | Sahara et al. |
| 6,410,902 | B1 * | 6/2002 | Matsumoto ............ 250/214 LA |
| 6,421,085 | B1 | 7/2002 | Xu |
| 6,563,185 | B2 | 5/2003 | Moddel et al. |
| 6,656,185 | B2 | 12/2003 | Gleason et al. |
| 6,693,311 | B2 | 2/2004 | Guenter et al. |
| 6,720,588 | B2 | 4/2004 | Vickers |
| 6,720,589 | B1 | 4/2004 | Shields |
| 6,741,341 | B2 | 5/2004 | DeFlumere |
| 6,797,581 | B2 | 9/2004 | Vickers |
| 6,914,314 | B2 | 7/2005 | Merrill et al. |
| 6,927,889 | B2 | 8/2005 | Schwarte et al. |
| 7,012,738 | B1 | 3/2006 | Schwarte et al. |
| 7,119,316 | B2 * | 10/2006 | Green et al. ............... 250/206.1 |
| 7,262,402 | B2 | 8/2007 | Niclass et al. |
| 2001/0020863 | A1 | 9/2001 | Cova et al. |
| 2001/0023944 | A1 | 9/2001 | Maruyama et al. |
| 2002/0024058 | A1 | 2/2002 | Marshall et al. |
| 2003/0164444 | A1 | 9/2003 | Yoneda et al. |
| 2004/0130702 | A1 | 7/2004 | Jupp et al. |
| 2004/0245592 | A1 | 12/2004 | Harmon et al. |
| 2004/0257962 | A1 | 12/2004 | Walker et al. |
| 2005/0012033 | A1 | 1/2005 | Stern et al. |
| 2005/0077539 | A1 | 4/2005 | Lipson |
| 2005/0087673 | A1 | 4/2005 | Chen et al. |
| 2006/0124832 | A1 | 6/2006 | Harmon et al. |
| 2006/0175529 | A1 | 8/2006 | Harmon et al. |
| 2006/0266926 | A1 | 11/2006 | Chuang et al. |
| 2008/0006816 | A1 | 1/2008 | Krishna et al. |

OTHER PUBLICATIONS

Y. Zhang, E.P. Walker, W. Feng, H. Zhang, and S. Esener, Numerical aperture influence on 3-D multi-layer optical data storage systems, Call/Recall, Inc., 2002, 3 pgs.

E.P. Walker, W. Feng, Y. Zhang, H. Shang, F.B. McCormick, and S. Esener, 3-D parallel readout in a 3-D multilayer optical data storage system, Call/Recall, Inc., 2002, 3 pgs.

J.S. Pan, P.H. Liu, Y. Chen, W.Y. Wu, C.Y. Chen, J.B. Yang, M.T. Yang, H.F. Hsieh, P.Y. Wang, M.Y. Chao, L.L. Lin, J.H. Shieh, Ch.N. Chen, H.W. Kao, Y.Y. Lin, C.N. Chiu, H..C. Chen, S.C. Hu, S.F. Tsai, C.C. Hsu, C.C. Mao, and C.C. Chen, A CMOS Multi-Format Read/Write So9C for 7x Blu-ray/16x DVD/56x CD, ISSCC 2005, Session 31, Mass Storage 31.3, pp. 572-573 and 618.

C. Niclass, A. Rochas, P.A. Besse, and E. Charbon, Design and Characterization of a CMOS 3-D Image Sensor Based on Single Photon Avalanche Diodes, IEEE Journal of Solid-State Circuits, Sep. 2005, vol. 40, No. 9, pp. 1847-1854.

A. Rochas, G. Ribordy, B. Furrer, P.A. Besse, and R.S. Popovic, First Passively-Quenched Single Photon Counting Avalanche Photodiode Element Integrated in a Conventional CMOS Process with 32ns Dead Time, Proceedings of the SPIE, 2002, 4833, No. 22, 9 pgs.

C. L. Niclass, A. Rochas, P.A. Besse, and E. Charbon, A CMOS Single Photon Avalanche Diode Array for 3D Imaging, IEEE International Solid State Circuits Conference, 2004, Session 6, Imaging 6.7, 10 pgs.

A. Rochas, M. Gosch, A. Serov, P.A. Besse, R. S. Popovic, T. Lasser, and R. Rigler, First Fully Integrated 2-D Array of Single-Photon Detectors in Standard CMOS Technology, IEEE Photonics Technology Letters, Jul. 2003, vol. 15, No. 7, pp. 963-965.

A. Rochas, M. Gani, B. Furrer, P.A. Besse, and R. S. Popovic, Single photon detector fabricated in a complementary metal-oxide-semiconductor high-voltage technology, Review of Scientific Instruments, Jul. 2003, vol. 74, No. 7, pp. 3263-3270.

B.F. Aull, A.H. Loomis, D.J. Young, R.M. Heinrichs, B.J. Felton, P.J. Daniels, and D.J. Landers, Geiger-Mode Avalanche Photodiodes for Three-Dimensional Imaging, Lincoln Laboratory Journal, 2002, vol. 13, No. 2, pp. 335-350.

M.A. Albota, R.M. Heinrichs, D.G. Kocher, D.G. Fouche, B.E. Player, M.E. O'Brien, B.F. Aull, J.J. Zayhowski, J. Mooney, B.C. Willard, and R.R. Carlson, Three-dimensional imaging laser radar with a photon-counting avalanche photodiode array and microchip laser, Applied Optics, Dec. 20, 2002, vol. 41, No. 36, pp. 7671-7678.

B.R. Aull, A.H. Loomis, D.J. Young, A. Stern, B.J. Felton, P.J. Daniles, D.J. Landers, L. Retherford, D.D. Rathman, R.M. Heinrichs, R.M. Marino, D.G. Fouche, M.A. Albota, R.E. Hatch, G.S. Rowe, D.G. Kocher, J.G. Mooney, M.E. O'Brien, B.E. Player, B.C. Willard, Z.L. Liau, and J.J. Zayhowski, Three-dimensional imaging with arrays of Geiger-mode avalanche photodiodes, Proceedings of SPIE, 2004, vol. 5353, pp. 105-116.

F. Zappa, S. Tisa, A. Gulianatti, A. Galivanoni, and S. Cova, Monolithic CMOS Detector Module for Photon Counting and Picosecond Timing, IEEE, Sep. 2004, pp. 341-344.

M.S. Albota, B.F. Aull, D.G. Fouche, R.M. Heinrichs, D.G. Kocher, R.M. Marino, J.G. Mooney, N.R. Newbury, M.E. O'Brien, B.E. Player, B.C. Willard, and J.J. Zayhowski, Three-Dimensional Imaging Laser Radars with Geiger-Mode Avalanche Photodiode Arrays, Lincoln Laboratory Journal, 2002, vol. 13, No. 2, pp. 351-370.

J.C. Jackson, A.P. Morrison, and B. Lane, Characterization of Large Area SPAD Doctors Operated in Avalanche Photiode Mode, IEEE 13th Annual Meeting, Nov. 13-16, 2000, vol. 1, pp. 17-18.

Walker, Edwin P. et al., Two-photon Volumetric Optical Disk Storage Systems Experimental Results and Potentials, Call/Recall, Inc., three pages, 2003.

Zang, Yi et al., Numerical Aperture Influence on 3-D Multi-layer Optical Data Storage Systems, Call/Recall, Inc. and Genoptix Inc., three pages, 2002.

Walker, Edwin P. et al., 3-D Parallel Readout in a 3-D Multi-layer Optical Data Storage System, Call/Recall, Inc., Genoptix, Inc. and Emcore Fiber Optics Components, three pages, 2002.

Pan, Jyh-Shin et al., A CMOS Multi-Format Read/WriteSoC for 7x Blu-ray/16x DVD/56x CD ISSCC 2005, Session 31, Mass Storage 31.3, pp. 572-573 and 618.

Niclass, C. et al., Design and Characterization of a CMOS 3-D Image Sensor Based on Single Photon Avalanche Diodes, IEEE Journal of Solid-State Circuits, pp. 1847-1854 (Sep. 2005).

Rochas et al., First Passively-Quenched Single Photon Counting Avalanche Photodiode Element Integrated in a Conventional CMOS Process with 32ns Dead Time, Proceedings of the SPIE, 4833, No. 22 (2002), nine pages.

Niclass et al., A CMOS Single Photon Avalanche Diode Array for 3D Imaging, ISSCC 2004, Session 6, Imaging , 6.7 (2004), 10 pages.

Rochas et al., First Fully Integrated 2-D Array of Single-Photon Detectors in Standard CMOS Technology, IEEE Photonics Technology Letters, 15(7):963-965 (2003).

Rochas et al., Single Photon Detector Fabricated in a Complementary Metal-Oxide-Semiconductor High-Voltage Technology, Review of Scientific Instruments, 74(7):3263-3270 (2003).

Aull et al., Geiger-Mode Avalanche Photodiodes for Three-Dimensional Imaging, Lincoln Laboratory Journal,, 13(2):335-350 (2002).

Albota et al., Three-Dimensional Imaging Laser Radar with a Photon-Counting Avalance Photodiode Array and Microchip Laser, Applied Optics , Dec. 2002 , vol. 41, No. 36.

Aull et al., Three-Dimensional Imaging with Arrays of Geiger-Mode Avalance Photodiodes, Semiconductor Photodetectors, Proceedings of SPIE, vol. 5353, 2004.

Zappa et al., Monolithic CMOS Detector Module for Photon Counting and Picosecond Timing, IEEE, Sep. 2004, pp. 341-344.

Albota, Marius A., Three-Deimensional Imaging Laser Radars with Geiger-Mode Avalanche Photodiode Arrays, Lincoln Laboratory Journal, vol. 13, No. 2, 2002, pp. 351-370.

Jackson, J.C., Characterization of Large Area SPAD Detectors Operated in Avalance Photodiode Mode, 13th Annual Meeting, IEEE, vol. 1, Nov. 13-16, pp. 17-18, 2000.

* cited by examiner

INTEGRATED CIRCUIT COMPRISING AN ARRAY OF SINGLE PHOTON AVALANCHE DIODES

The present application is a continuation of U.S. Ser. No. 11/353,244, filed on Feb. 14, 2006, now U.S. Pat. No. 7,547,872, and claims priority of EP patent application 2005EP-101069 (EP05101069.2), filed on Dec. 14, 2005, which are hereby incorporated by reference.

The present application also incorporates by reference the content of U.S. utility patent application Ser. No. 11/290,831, filed on Dec. 1, 2005, and of U.S. provisional patent application 60/652,010, filed on Feb. 14, 2005.

FIELD OF THE INVENTION

The present invention concerns a circuit comprising at least one single photon avalanche diodes (SPADs), or an array of such SPADs.

DESCRIPTION OF RELATED ART

Single photon avalanche diodes (SPADs) are photodiodes operating in the so-called Geiger mode. SPADs have several advantages over photodiodes operating in the linear mode. Among the most important ones are a higher sensitivity and very precise timing response. SPADs are becoming of great interest for a number of new and potentially high volume applications, e.g. human-computer interfaces, automotive airbag deployment control, face recognition, etc.

In addition, applications requiring fast and precise depth map evaluation may be further improved by taking advantage of arrays of SPADs. 3D imaging circuits using arrays of SPADs may be used for determining the time-of-flight of optical pulses reflected by a scene, thus measuring the distance to each point of the scene. These circuits may be used in various applications, including face recognition, virtual keyboards, object and person monitoring, land and sea surveyors, virtual reality games, non-ionizing medical tomographic imagers, stage and choreography analysis tools, etc. Speed, compactness and especially cost concerns prompt the emergence of a new generation of solid-state imagers and of other improved circuits based on SPADs.

Existing arrays of SPADs suffer from a limited lateral resolution due to the lack of an efficient readout circuitry. Indeed SPADs cannot store brightness information since single photon detection is translated to a discrete electrical pulse. Moreover, the resulting pulse has the same amplitude whether it had been triggered by a single or multiple photons. Intensity information can however be obtained by counting such pulses during a certain period of time or by measuring the existing interval between successive pulses.

U.S. Pat. No. 5,892,575 describes a tri-dimensional array of sensors comprising means for determining the time-of-flight of photons, thus allowing a measure of the distance between the sensor and the scene. Each sensor comprises an avalanche photodiode. The sensor is not CMOS compatible and necessitates a complex technology which is expensive and hard to integrate on a monolithic integrated circuit.

The article of B. F. Aull et al "Geiger-Mode Avalanche Photodiodes for Three Dimensional Imaging", published in the Lincoln Laboratory Journal, Vol. 12, No. 2, 2202, pp. 335-350, describes another non-CMOS circuit that requires a first, non CMOS array of diodes operating in Geiger mode and a second CMOS circuit for the time discriminators. Use of two different chips and wire-bonding of the chips, makes the fabrication of very high resolution chip expensive. Multiple technologies could be combined into a single chip; however this is also an expensive proposition.

The article of A. Rochas et al. "Single photon detector fabricated in a complementary metal-oxide-semiconductor high voltage technology", Review of Scientific Instruments, Vol. 74, Nr 7, July 2003, pp. 3263-3270, describes a single photon detector based on CMOS SPAD, proposes a generalization to two-dimensional arrays which is left to be investigated. However, this document does not relate to 2D or 3D imagers based on SPADs. Although a relatively high number of transistors is required at the pixel level, this document does not suggest any means to select the SPADs, active or inactive at each moment. Moreover, the read-out circuit does not include any time-to-digital converter, pulse counter or any structure integrated on the chip for processing signals output by the SPADs. The process unfortunately uses a more expensive and non-standard CMOS technology. Furthermore, high-voltage transistors, which require more power, are additionally area-expensive devices which lead to an extremely low fill-factor if an array of SPADs were to be implemented.

The article of A. Rochas et al., "First Fully Integrated 2-D Array of Single-Photon Detectors in Standard CMOS Technology", IEEE Photonics Technology Letters, Vol. 15, Nr 7, July 2003, pp. 963-965, describes a two-dimensional array of CMOS SPADs for fluorescence lifetime measurement and fluorescence correlation spectroscopy. This document does not relate to integrated 2D or 3D imagers, and requires a multiplexing part outside of the array of SPADs for selection of the active SPAD at each moment. The multiplexer requires the same number of outputs as the number of SPADs in the array; moreover, one dedicated line must be provided between each SPAD and the multiplexer. This solution is thus hardly scalable, and poorly adapted to arrays comprising tens or even hundreds of SPADs, as required by modern imagers.

A 8×4 array of SPADs integrated in a conventional CMOS technology is presented in the article by the inventors C. Niclass, A. Rochas, P. A. Besse, and E. Charbon, "A CMOS Single Photon Avalanche Diode Array for 3D Imaging", Proc. IEEE ISSCC, pp. 120-121, Feb. 14, 2004. Monolithic implementations of such architecture lead however to a strongly reduced fill factor.

A. Rochas, G. Ribordy, B. Furrer, P. A. Besse and R. S. Popovic further disclosed in "First Passively-Quenched Single Photon Counting Avalanche Photodiode Element Integrated in a Conventional CMOS Process with 32 ns Dead Time", Proceedings of the SPIE (The International Society for Optical Engineering), 4833, no. 22, pp. 107-115, 2002, a standard CMOS implementation whereby the substrate is kept to ground potential. Lateral diffusion p-n junction, as disclosed in EP1191598, is used as a guard ring for preventing premature breakdown. As a result, the operating bias voltage of the SPAD is shared between the readout's power supply on the cathode and an isolated high negative voltage on the anode. The signal is then detected at the cathode by the readout circuit since the voltage swing is inside the range between ground and power supply voltage. This implementation has several drawbacks. Firstly, this implementation has two vertical junctions. The first junction is formed between the p+ and the n-well layers and the second is formed between n-well and p-substrate. Since the SPAD photomultiplication region (PMR) is formed in the first junction, all the photons detected beyond the second junction are not counted. This occurs because the corresponding photo-generated carriers are not able to diffuse through the second junction in order to reach the PMR. This behavior limits the photo-detection for red and infrared photons, which are absorbed more deeply in the substrate. Secondly, photons absorbed in the n-well, outside the PMR, generate minor carriers which should diffuse to the PMR as fast as possible in order to be detected. Unfortunately, in the n-well, minor carriers are holes which mobility and ionization coefficient are much lower than those of electrons. This further reduces the photo-detection capability of such SPADs based on that method.

Therefore, it is an aim of the prevent invention to propose a new integrated circuit comprising an array of SPADs that overcomes the drawbacks of the prior art.

BRIEF SUMMARY OF THE INVENTION

According to the one aspect, a circuit comprises an array of single photon avalanche diodes (SPADs), a plurality of read-out circuits, each SPADs being coupled to one read-out circuit, wherein at least some of the read-out circuits comprise a time-to-digital converter (TDC) and/or asynchronous counter, wherein a plurality of SPADs are coupled to one of said read-out circuits.

This has the advantage that, among others, at least part of the read-out circuits are shared between several pixels, thus reducing the number of transistors per pixels and improving the fill-in factor of the circuit. Furthermore, the number of power-hungry read-out circuits is reduced.

At least some part of the read-out circuit, such as the counters and TDCs, can be moved outside the SPAD array, but preferably on the same chip. This has the advantage that the fill-in factor of the SPAD array can be improved, thus the distance between pixels reduced.

Several SPADs, for example all SPADs in a row, can be read simultaneously and the corresponding digital values stored in a memory store on the chip. The next rows will be read at a different time and the corresponding values stored in the same memory store, at the same address or at a different location. The memory store is preferably on the same chip, but outside the SPAD array. Thus, communications required for the outside world are reduced by processing information on-chip and by multiplexing information on few data and address lines.

SPADs connected to a same read-out circuit can be addressed with a parallel, sequential or another scheme.

Processing, for example counting or time discrimination, can be partitioned at pixel-level and at column/row or chip-level. Each level will require a different accuracy, thus different power optimizations are possible.

The pixel readout circuit is shared between a group of pixels, e.g. all the pixels in a same column or row. The disclosed circuit is capable of handling simultaneously all the concerned pixels so that pixel size can be reduced and fill factor can be significantly improved. The readout circuit architecture is capable of handling simultaneously a cluster of several pixels almost in parallel so that partial counts at pixel-level do not need to be stored.

According to another aspect a circuit comprises at least one single photon avalanche diode (SPAD) for generating electrical pulses each time a photon is received, a read-out circuit for processing said pulses, wherein the read-out circuit comprises an integrated transformer for decoupling the SPAD from other parts of said read-out circuit.

This has the advantage of coupling the SPAD with the read-out circuit using galvanic isolation techniques, thus solving the problems caused by high voltages in the SPADs while maintaining high performance and reducing power consumption. Furthermore, the proposed method is very useful in mainstream semiconductor technologies such as standard CMOS and/or BiCMOS processes.

BRIEF DESCRIPTION OF THE DRAWINGS

The invention will be better understood with the aid of the description of an embodiment given by means of example and illustrated by the figures, where.

DETAILED DESCRIPTION OF PREFERRED EMBODIMENTS

Figure 1:
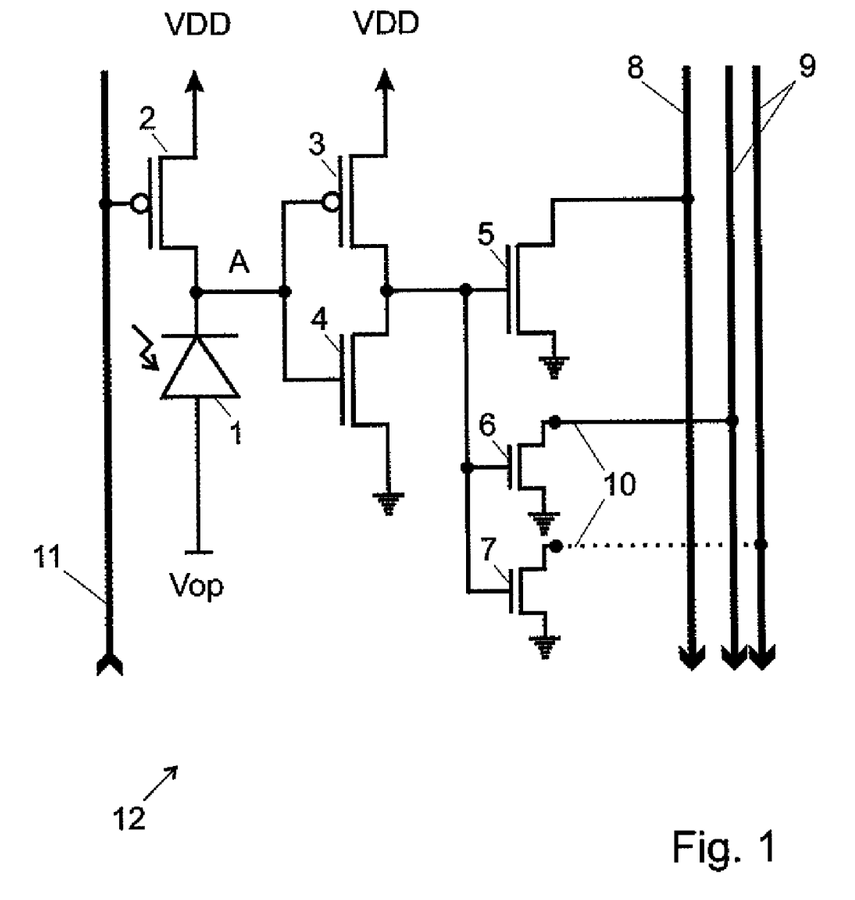
FIG. 1 shows an embodiment of a pixel based on a SPAD with the associated readout circuit.

FIG. 1 shows an embodiment of a pixel 12 based on a SPAD (single photon avalanche diode). A SPAD is a p-n junction biased above breakdown voltage $V_{bd}$ by an excess voltage $V_e$ of a few volts. Operated in the so-called Geiger mode, avalanche photodiodes can react on single photons. A primary carrier resulting from the absorption of a photon may generate a nearly-infinite number of secondary electron-hole pairs by impact ionization.

In the embodiment of pixel illustrated by FIG. 1, reference numeral 1 represents the SPAD; 2 is a quenching (recharging) transistor; 3 and 4 define a CMOS inverter, 5 is the output transistor, 6 and 7 represent addressing transistors, 8 is a shared output bus line, 9 denotes shared address bus lines, 10 are connections used to code the pixel address, 11 is an optional recharging line.

Figure 2:
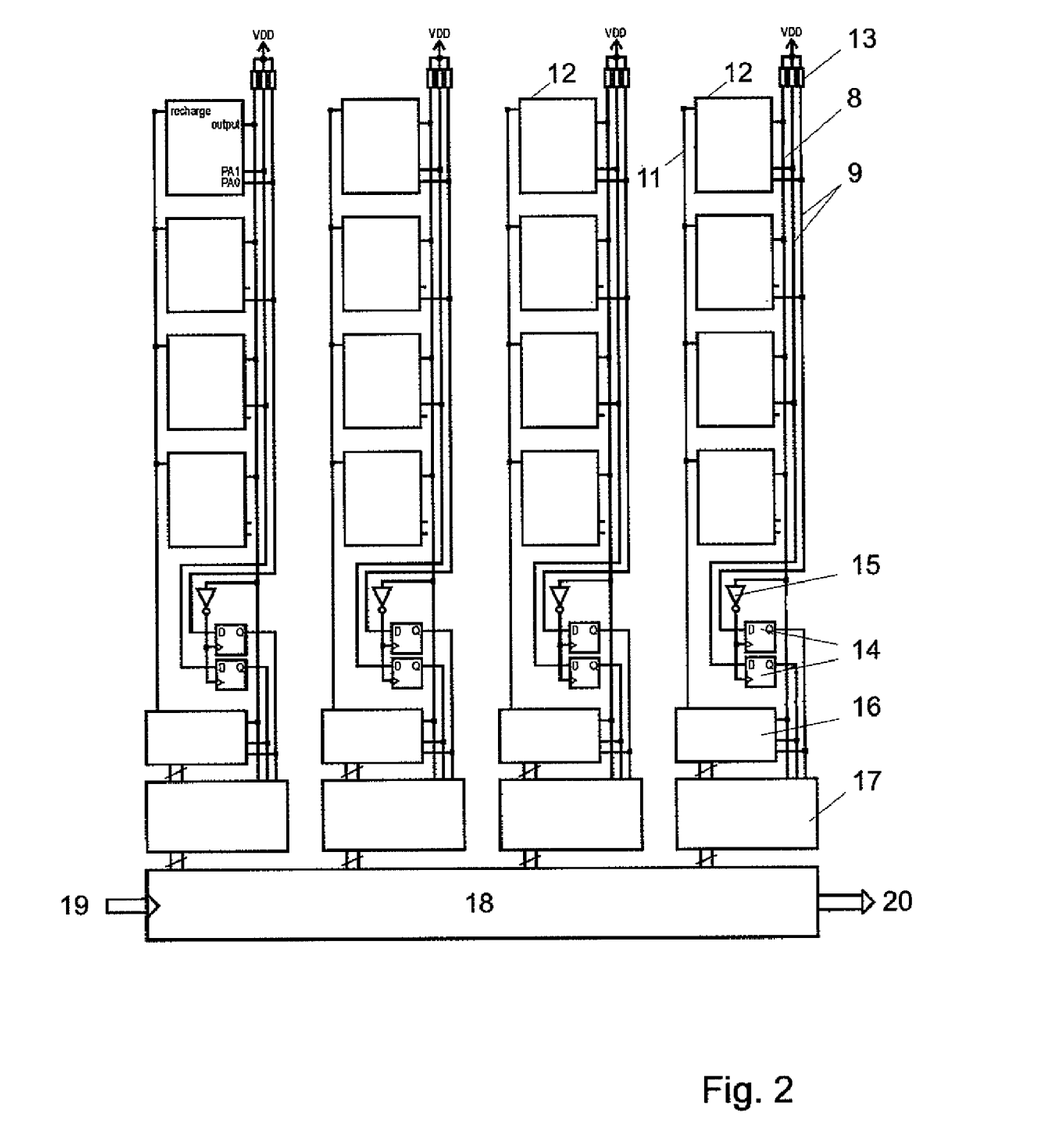
FIG. 2 shows an example of sensor comprising an array of pixels with one column readout circuit and one Time-to-Digital Converter (TDC) and/or asynchronous counter (AC) element in each column.

FIG. 2 shows an example of the proposed architecture whereby the pixel readout circuit is arranged in columns. In order to simplify the description, a m×n array of =4×4 pixels will be considered in this description, but the principle is clearly applicable to much larger arrays, including arrays with tens, hundreds or even thousands of lines and/or columns. The invention is also applicable to arrays comprising one single row or column of pixels.

Also note that the pixel readout circuits can be arranged in several different fashions, for example in rows, etc., and are still be based on the same principle. Reference numeral 12 represents the pixel circuit, for example as depicted in FIG. 1 or in FIG. 3, reference numeral 13 are pull up resistors, 14 represents memory elements, e.g. latches or buffers, triggered by the output signals of the different pixels, 15 shows an inverter, 16 is a synchronization readout circuit, 17 represents n read-out circuits, each readout-circuit comprising for example one asynchronous counter (AC) or one time-to-digital converter (TDC). Reference numeral 18 shows the sensor readout and data storage circuit for storing data read from one or preferably all rows, 19 shows an input bus for control signals, and reference numeral 20 represents the sensor output data bus (external interface) for delivering data stored in circuit 18 in serial or parallel mode.

An external input pin (not shown) may be provided as a START signal, the START signal being coupled to the START input of each TDC in the readout-circuits 17. The START signal corresponds, for example, to the emission time of a laser pulse.

In idle mode, in order to operate in the so-called Geiger mode, the SPAD 1 is reverse biased, above its breakdown voltage, at VDD+|Vop| where VDD is the power supply and Vop is a negative operating voltage. The input A of the CMOS inverter 3, 4, which is connected to the SPAD's cathode, is recharged to VDD through the quenching device (resistor or transistor acting as a resistor) 2. Its output is therefore at the ground potential in idle mode. As a result, transistors 5, 6 and 7 are blocked. The output bus and addressing lines are set to VDD through pull up resistors (or transistors) as illustrated in FIG. 2.

When a photon is absorbed in the SPAD's photomultiplication region, a current pulse discharges the SPAD's parasitic capacitance. As a result, a voltage pulse, i.e. the Geiger pulse, is generated. Its falling edge is translated into a digital rising edge on the inverter's 3, 4 output which, in turn, drives transistors 5, 6 and 7. Consequently, a precise falling edge can be detected on the output line 8 as it is temporarily pulled down by the transistor 5. In addition, the position of the pixel in the column, which is coded into a unique binary address through simple connections 10, is translated into address bus lines 9 by the same principle. The address is then synchronously latched in the latches 14 by means of the output line in the bottom of the column. An optional buffer 15 may be used in order to respect the latch's setup time and to match the trigger level of the latch's clock input.

The circuit of FIG. 2 thus does not comprise selection lines for selecting the row active at each instant. There is no sequential scanning of the rows, and pixels may be read more often than others. Rather, reading of the pixels is event-based: when a photon is detected by a pixel, a value depending on the activated row is output by the latches 14.

The output line's falling edge, which is well defined, can also be used to increment an asynchronous counter (AC) in the read-out circuit 17, for determining the number of photons received during predetermined intervals and thus measure the brightness. In addition, or alternatively, signals output by the latches 14 may trigger TDCs in the read-out circuits 17 in time-correlated mode, for distance measurement.

Once the address is latched and read, the SPAD can be recharged by means of the recharging line 11, driven by a synchronization readout circuit 16. The practical implementations of AC and/or TDC in the readout circuits 17 may lead to an additional dead time. During this time, other SPADs in the same column, which are completely recharged, can detect photons. Nevertheless, since the output line stays down until the next column recharging process, the new false address is not latched again, thus ignored during the readout dead time.

The sensor readout circuit 18 is used as a sensor interface so as to allow the sensor data to be read externally. This sensor readout circuit may be externally driven and configured by an input control signal bus 19. Configuration and image data are externally read by means of a sensor output bus 20. The sensor architecture may be implemented in many different ways. In many cases, memory buffers may be used in order to store the data before they are able to be read from outside. An interesting case of this global readout is when each column (or cluster of SPADs sharing the same pixel readout circuit) is connected to a single input/output pad using a serial protocol. General cases however are likely to group several clusters taking advantage of on-chip memory banks. In these cases, the external interface is likely to be the same as or similar to the interface of existing random access memories.

The proposed pixel readout circuit has several advantages as compared to prior art. Pixels can be miniaturized especially for large SPAD arrays. The readout circuit is not at pixel level, but on the same monolithic integrated circuit outside the array of SPADs. Only a very small number of transistors is therefore required at pixel level, leading to a very high fill factor. Moreover, as m pixels in each column share one single readout circuit, the total amount and space required by the readout circuit is drastically reduced.

The total number of transistors per pixel in this configuration is estimated as $N_t = 4 + \text{Ceiling}(\text{Log}_2(N_{ROWS}))$, where $N_{ROWS}$ is the number of rows in the array. For an array of 1024×1024 pixels, $N_t$ is 14, which is comparable with high-speed commercial imagers of similar resolution. Power consumption is maintained to a minimum level so that only triggered SPADs are recharged. If necessary, the recharging line 11 can be suppressed by means of a long-channel quenching transistor 2 with its gate connected to ground.

Depending on the position within the pixel and on the bias configuration of the SPAD, p-channel and n-channel transistors can be exchanged. This configuration is still compatible with the proposed principle. However, in the best embodiment, reference numerals 5, 6 and 7 are n-channel transistors leading to the best tradeoff between transistor size and driving strength.

Figure 3:
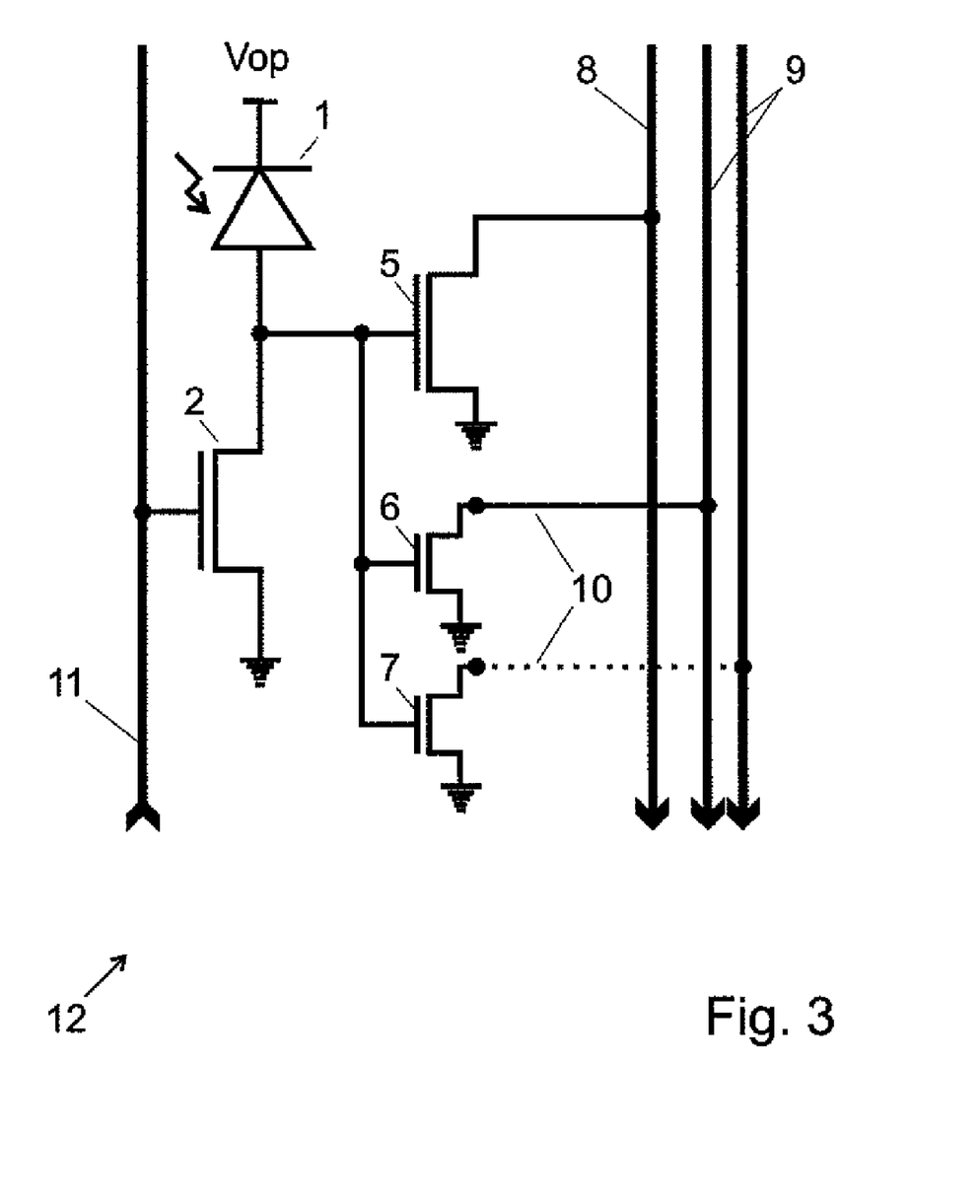
FIG. 3 shows another embodiment of a pixel based on a SPAD with an associated readout circuit having a reduced number of transistors.
Figure 4:
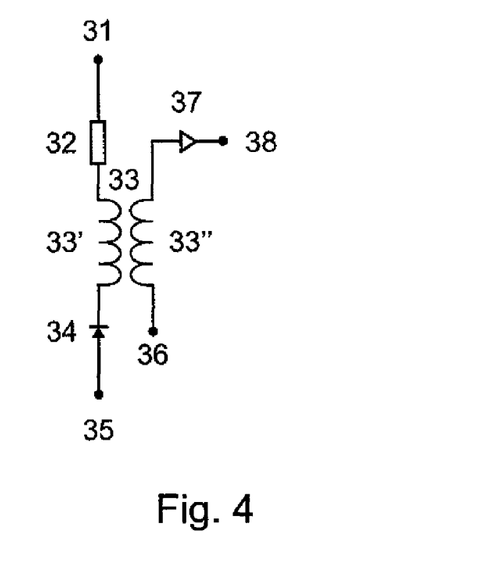
FIGS. 4 to 7 illustrate various embodiments of pixels based on SPADs and using an integrated transformer to bias and/or quench the SPADs
Figure 5:
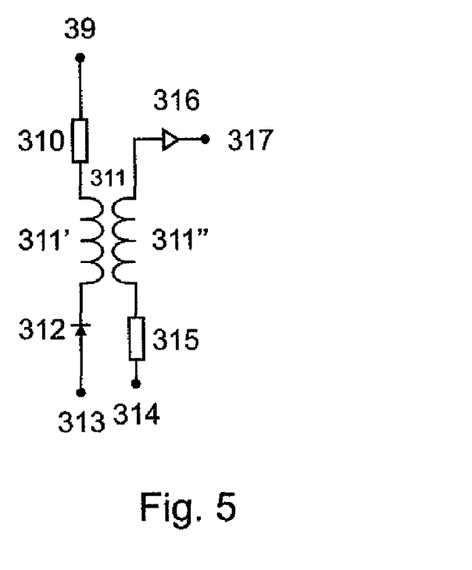
Figure 6:
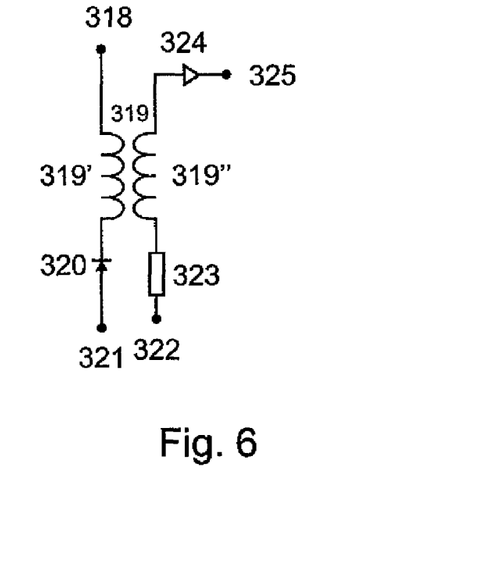
Figure 7:
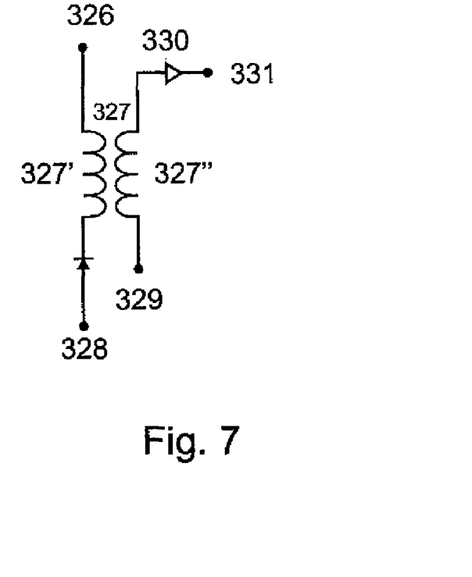

FIG. 3 shows a variation of the proposed pixel 12 with a different readout architecture, in which the pixel size and the number of transistors are further reduced. In this configuration, the quenching transistor 2 is an n-channel transistor and its position is exchanged with that of the SPAD. The operating voltage Vop is, in this case, a positive voltage so that the SPAD is still reverse biased above its breakdown voltage. As a result, the inverter made up of the transistors 3 and 4 may be suppressed. $N_t$ could be decreased by 2 leading to $N_t = 12$ for an array of 1024×1024 SPADs. In this configuration, however, the SPAD's parasitic capacitance is not optimal, thus possibly increasing SPAD dead time, afterpulsing and crosstalk probability.

The embodiment of FIG. 2 uses one read-out circuit 17 shared by all pixels in a column. It may also be possible to use several read-out circuits in each column, using for example several output lines in each column. Moreover, it may be possible to group pixels associated with one read-out circuit in a different way, for example by coupling all pixels in a row, or in a sub-array, to one read-out circuit.

Embodiments may also be imagined in which detection of a photon by any pixel triggers a signal on an addressing column and, simultaneously, on an addressing line. Identification of the activated pixel may then be based on correlation of activation times of lines and columns.

Although this would reduce the number of selection columns, this would however increase the risk of collision when photons are received simultaneously by several pixels.

In order to operate in the so-called Geiger mode, SPADs have a special design, possibly involving a guard-ring, which allows the diode to be biased above its nominal breakdown voltage. Typical p-n junctions, on the other hand, cannot detect single photons because they suffer from premature breakdown. Indeed, if one tries to bias a typical p-n junction beyond breakdown voltage, there would be an instantaneous electrical current flowing in the diode avoiding any optical detection. A SPAD guard-ring structure (SGR) may be implemented so as to detect single photons and avoid premature breakdown. The implementation of SGR requires additional doped layers with different doping concentrations. Apart from the p-type and n-type layers of the junction, an additional p-type or n-type layer, which is usually less doped, is required for the simplest feasible SGR.

Unfortunately, conventional CMOS technologies have two main limitations: a restricted number of available doped layers and a relatively low nominal voltage if compared to the breakdown voltage of p-n junctions. In a conventional CMOS process, the only available layers are the n+ and p+ transistor source/drain regions, the n-well and p-substrate (or p-well and n-substrate). In a twin-tub CMOS process, both p-well and n-well regions are also available. Furthermore, if some readout electronics are implemented in the same integrated circuit, the substrate should be kept to the lowest potential (p-substrate) or highest potential (n-substrate). This additional constraint is very critical since it fixes the potential of one important layer which could not, so far, be used for the implementation of the SPAD. So far, all the reported standard CMOS implementations of SPADs fully integrated with their readout electronics have not employed the substrate layer in the SPAD. The reason is that if one side of the SPAD was connected to the lowest (or highest) potential, then the other side of the SPAD, where the signal should be detected, would be biased above breakdown voltage. This voltage is obviously not compatible with the acceptable voltage levels of standard integrated electronics.

As a conclusion, due to their physical nature, single photon avalanche diodes operate at relatively high voltages that may damage the readout circuit, or necessitate special read-out circuits operating at high voltages that require a large area, are expensive and power hungry.

According to another aspect of the present invention, a new implementation of the SPADs is proposed to avoid the problems caused by high voltages in the SPADs, by using an integrated transformer to bias and quench the SPADs. Those new SPADs may be used in combination with the above described read-out circuit, or independently.

Examples of pixels based on SPADs and including transformers are illustrated on FIGS. 4 through 7. When a photon hits the surface of a SPAD 34, 312, 320 or 332, an avalanche current is triggered that flows through the coils 33', 311', 319' and 327' respectively. A significant variation in potential is observed across the secondary coil 33", 311", 319", 327" of the transformer, thus generating an electrical pulse. Such pulse may be optionally amplified by means of an amplifier or logic buffer 37, 316, 324, 330 and can be consequently read as a digital signal from the remaining readout circuit, using for example an inverter and/or pixel addressing transistors. Note that the magnetic coupling factor k is not critical due to the high voltage ratios between primary and secondary, thus allowing relatively low quality implementations of the coils as it is the typical case in integrated circuits.

There are several advantages to this circuit. Firstly, by using a transformer, it is possible to use the substrate as part of the junction, by keeping it to ground (or power supply for n-type substrate), and by applying the high bias voltage on the other side of the junction. Detection signal is seen from the secondary, and all other available layers in the process can be used for implementing the SGR. Secondly, a galvanic separation between high voltage and low voltage components could be achieved, even within an imager pixel, thus dramatically increasing the reliability and other mass production requirements of a chip built using this method. Thirdly, an important power dissipation reduction could be achieved since all the readout electronics operate in low voltage. Fourthly, the transformer also accomplishes other tasks such as quenching and recharging of the SPAD.

The quenching circuit is important for SPADs. Indeed, after a photon is detected, in order to save power, the avalanche current should be stopped as fast as possible. A simple method used to quench the avalanche is the introduction of a resistive path between the SPAD and the bias voltage supply 31, 39, 318, 326. This resistive path can be a simple resistor or, in this case, the equivalent impedance of the transformer seen from the primary. This is very useful since transformers present frequency dependant impedances, which can be optimally used, with or without additional resistors 32, 310, 315, 323, to quench the avalanche in SPADs. Moreover, transformers can be partially or totally implemented using available resistive layers such as polysilicon in order to provide sufficient resistive path.

Another function of the transformer may be to recharge the SPAD above breakdown voltage so that subsequent photons can be detected. Once more, dynamic behavior of transformers can be used, maybe coupled with capacitors but not necessarily, to quickly recharge the SPAD using peaking techniques so that detection ability is recovered.

The transformer thus decouples the single photon avalanche diodes fabricated in commercial, preferably CMOS integrated circuits technologies from read-out circuit. The output signal at the output of the SPAD is thus transferred to the read-out circuitry without electrical coupling, using magnetic coupling technologies. The output signal of a single photon avalanche diode can also be transferred to a different chip of same technology, of different technology, or to a different portion of the same chip using the same or a different technology.

It also increases the reverse bias and the sensitivity of the single photon avalanche diode fabricated in commercial integrated circuits technologies.

The integrated transformers can be fabricated by using superimposed polysilicon layers, lateral polysilicon layers, superimposed metal layers, lateral metal layers, superimposed polysilicon and metal layers, and/or lateral polysilicon and metal layers. A quenching resistance can be integrated in the transformer primarily. Voltage gain can be controlled through appropriate ratio of the primary and secondary coils of the transformer.

The invention claimed is:

1. An integrated circuit comprising an array of integrated single photon avalanche photodiode (SPAD) having an avalanche junction comprising an integrated transformer to avoid premature breakdown of the avalanche junction and/or to quench the photodiode.

2. The integrated circuit of claim 1, said transformer being implemented by using resistive layers.

3. The integrated circuit of claim 1, said transformer decoupling said SPAD from other parts of said circuit.

4. The integrated circuit of claim 1, said transformer comprising a first coil and a second coil, said first coil being arranged so that avalanche current triggered by photons through said SPAD flows through said first coil, thus generating an electrical pulse in said second coil.

5. The integrated circuit of claim 3, further comprising a circuit for converting said pulse through said second coil into a digital, CMOS compatible pulse.

6. The integrated circuit of claim 1, comprising a substrate being part of the PN junction where the avalanche is triggered by photons, a bias voltage being applied through said transformer on the other side of said junction.

7. The integrated circuit of claim 1, said transformer being fabricated using one of the following: superimposed polysilicon layers, lateral polysilicon layers, superimposed metal layers, lateral metal layers, superimposed polysilicon and metal layers, and/or lateral polysilicon and metal layers.

8. A CMOS circuit comprising at least one CMOS implemented single photon avalanche photodiode (SPAD) having an avalanche junction and a corresponding number of associated integrated transformers, at least one associated integrated transformers connected in series with each of said SPADs to avoid premature breakdown of the avalanche junction or to quench the photodiode.

9. An integrated circuit comprising:

an array of single photon avalanche diodes (SPADs), each SPAD comprising or being associated with an integrated transformer, the number of integrated transformers corresponding to the number of SPADs in the array, each SPAD being connected in series with one coil of the corresponding transformer.

10. An imager circuit comprising an array of integrated photodiodes, the photodiodes being arranged in groups, each group comprising at least one photodiode, a plurality of integrated transformers, the number of transformers corresponding to the number of groups of photodiodes, each group being associated with an integrated transformer decoupling said photodiode from other parts of said imager circuit.

11. A method for galvanically decoupling at least one avalanche diode in an integrated array of avalanche diode, said method comprising a step of connecting said avalanche diode with a first integrated coil and connecting another component with a second integrated coil, said first and second integrated coils forming a transformer.

* * * * *